US008410395B2

(12) United States Patent
Mienhardt (10) Patent No.: US 8,410,395 B2
(45) Date of Patent: Apr. 2, 2013

(54) METHOD FOR DETERMINING FOCAL POSITION (75) Inventor: Uwe Mienhardt, Korntal-Münchingen (DE)

(73) Assignee: TRUMPF Werkzeugmaschinen GmbH + Co. KG, Ditzingen (DE)

( * ) Notice: Subject to any disclaimer, the term of this patent is extended or adjusted under 35 U.S.C. 154(b) by 166 days.

(21) Appl. No.: 12/753,198

(22) Filed: Apr. 2, 2010

(65) Prior Publication Data
US 2010/0200552 A1 Aug. 12, 2010

Related U.S. Application Data (63) Continuation of application No. PCT/EP2008/006804, filed on Aug. 19, 2008.

(30) Foreign Application Priority Data

Oct. 2, 2007 (DE) .......................... 10 2007 047 298

(51) Int. Cl.
B23K 26/00 (2006.01)
(52) U.S. Cl. .......... 219/121.69; 219/121.67; 219/121.72
(58) Field of Classification Search ............. 219/121.67, 219/121.73, 121.74, 121.75, 121.78, 121.79, 219/121.8, 121.81, 121.84; 364/474.08; 359/845, 846, 847; 137/625.28, 599; 250/201.2; 356/123; 73/65
See application file for complete search history.

(56) References Cited

U.S. PATENT DOCUMENTS

| | | | | |
|---|---|---|---|---|
| 4,891,491 A | * | 1/1990 | Duley et al. | 219/121.64 |
| 5,667,707 A | * | 9/1997 | Klingel et al. | 219/121.67 |
| 5,670,773 A | * | 9/1997 | Planeix | 250/201.2 |
| 5,856,649 A | * | 1/1999 | Yamazaki et al. | 219/121.67 |
| 6,150,826 A | | 11/2000 | Hokodate et al. | |
| 2003/0102294 A1 | * | 6/2003 | Kinbara et al. | 219/121.83 |
| 2008/0180657 A1 | * | 7/2008 | Scholich-Tessmann et al. | 356/123 |

FOREIGN PATENT DOCUMENTS

| | | |
|---|---|---|
| DE | 10255628 | 7/2004 |
| DE | 10360353 | * 7/2005 |

(Continued)

OTHER PUBLICATIONS

Notification of Transmittal of Translation of the International Preliminary Report on Patentability from corresponding PCT Application No. PCT/EP2008/006804, mailed May 20, 2010, 12 pages.

(Continued)

*Primary Examiner* — Tu Hoang
*Assistant Examiner* — Thien S Tran
(74) *Attorney, Agent, or Firm* — Fish & Richardson P.C.

(57) ABSTRACT

A method for determining a reference focal position of a focused laser beam passing through an opening in a nozzle body of a laser processing nozzle relative to a workpiece, in which the method includes: simultaneously cutting off a portion of the workpiece using the focused laser beam to form an edge on the workpiece and altering a distance between a focal point of the focused laser beam and the workpiece in a direction of an axis of the laser beam; determining coordinates of the edge formed on the workpiece; based on the determined coordinates, determining a section of the edge that protrudes the furthest from the workpiece; and establishing a reference focal position FL of the laser beam based on the determined coordinates corresponding to the section of the edge that protrudes the furthest from the workpiece.

6 Claims, 3 Drawing Sheets

FOREIGN PATENT DOCUMENTS

| | | | |
|---|---|---|---|
| DE | EP1750891 | * | 2/2007 |
| EP | 1561538 | | 8/2005 |
| JP | 02160191 | | 6/1990 |
| JP | 02217188 | | 8/1990 |
| JP | 05008068 | | 1/1993 |
| JP | 05253685 | | 10/1993 |
| JP | 06328281 | * | 11/1994 |
| JP | 10076384 | * | 3/1998 |
| JP | 10258382 | | 9/1998 |
| JP | 10314966 | | 12/1998 |
| WO | 2004050290 | | 6/2004 |
| WO | 2006027085 | | 3/2006 |
| WO | 2006136192 | | 12/2006 |

OTHER PUBLICATIONS

International Search Report from corresponding PCT Application No. PCT/EP2008/006804, mailed Mar. 16, 2009, 22 pages.

Office Action from the German Patent Office for corresponding German Application No. 10 2007 047 298.8-34, mailed Mar. 26, 2008, 2 pages.

Office Action from the German Patent Office for corresponding German Application No. 10 2007 063 627.1-34, mailed Aug. 28, 2009, 2 pages.

English translation of Office Action from corresponding Chinese Application No. 200880110231.0, mailed Jun. 25, 2012, 6 pages.

* cited by examiner

METHOD FOR DETERMINING FOCAL POSITION

CROSS REFERENCE TO RELATED APPLICATION

This application is a continuation of and claims priority under 35 U.S.C. §120 to PCT/EP2008/006804, filed on Aug. 19, 2008, and designating the U.S., which claims priority under 35 U.S.C. §119 to German Patent Application No. 10 2007 047 298.8, filed on Oct. 2, 2007. The contents of both the prior applications are hereby incorporated by reference in their entirety.

TECHNICAL FIELD

The present disclosure relates to methods for determining a focal position of a laser beam. In particular, the disclosure relates to, among other things, determining a reference focal position of a focused laser beam passing through an opening in a nozzle body of a laser processing nozzle.

BACKGROUND

For laser processing of workpieces, it is preferable to know the focal position of the laser beam relative to the workpiece surface. In a calibration step, a search is therefore normally effected for a focusing setting at which the focal point of the laser beam lies on the workpiece surface. This focal point corresponds to the reference focal position. During processing, focal position offsets are adjusted relative to this reference focal position as a function of the task to be performed (e.g., producing a pilot hole in the workpiece, cutting the workpiece, or marking the workpiece).

In some cases, changes in the distance between the processing optics and the focal point of the beam may occur in laser processing machines (e.g., high laser powers) due to, for example, contamination of the focusing optics as a result of heating of the optical components in the beamline. The focal position on the workpiece and the precision of the laser processing machine therefore may also change. During operation, it is therefore preferable to repeatedly check the focal position in order to be able to detect a variation from the optimum focal position at an early stage and correct it.

Examples of methods for determining the reference focal position of a laser beam can be found in the references DE 102 55 628 A1, JP 02160191, JP 10258382, JP10314966 and JP10076384, in which a plurality of cutting lines is produced on the workpiece surface with the laser beam with a varying focal position. The width of the individual cutting lines is subsequently determined and the kerf having the narrowest width is determined. The focal position associated with the narrowest cutting width is adopted as the focus setting of the laser processing machine. In the methods described in the first four of the above-mentioned specifications, the width of the cutting line is determined using a camera positioned preferably at the laser processing head; in the fifth reference, the line width is determined capacitively, by moving the laser processing head transversely to the cutting lines and in so doing measuring the change in capacity using a capacity sensor located at the laser processing nozzle of the laser processing head.

Apart from the precise adjustment of the focal position, the position of the focused laser beam as it passes through the opening of the nozzle body of the laser processing nozzle during laser processing should also be precisely set, depending on the application, to a few one-hundredths of a millimeter, since this facilitates achieving a directionally independent processing result. The opening in the nozzle body through which the laser beam passes is generally circular, but other forms such as, for example, slots, are also possible.

The base setting of the correlation of the focused laser beam with the center of the laser processing nozzle and with a predetermined exit position of the laser beam from the laser processing nozzle can be altered when using a new laser processing head or after exchanging or cleaning components of the laser processing head. The correlation can be verified during operation of the laser processing machine on the basis of cyclic measurements, or if the processing result deteriorates. Such verification also can be performed if there is a change of focus setting.

Alignment of the laser beam in the opening of the laser processing nozzle can be carried out manually. In some cases, this include securing an adhesive tape over the nozzle opening and burning a small hole into the adhesive tape at low laser power. The variation of the beam position of the laser beam from the center of the nozzle is determined by the naked eye and a magnifying glass. The beam position is corrected by appropriate positioning units with adjusting screws, through which the position of the laser beam in an X-Y plane of the opening in the nozzle body that is at right angles to the nozzle axis can be altered in the X-direction and the Y-direction. This process can be imprecise, time-consuming and unsuitable for an automated process sequence because of the manual interventions that may be required.

JP 06328281 discloses using a laser beam to cut a circular aperture in a workpiece to center the laser beam in the laser processing nozzle, in which the midpoint of the aperture corresponds to the midpoint of the laser beam intensity in a plane that is perpendicular to the propagation direction of the beam. The middle of the circular opening in the laser processing nozzle is determined by touching opposite edges of the aperture with the nozzle body, the contact between nozzle body and the edge being detected by the short-circuit of a voltage applied between the nozzle body and the workpiece. If the midpoints of the laser beam and the nozzle opening do not coincide, the beam is aligned to the midpoint of the opening in the laser processing nozzle. This method may possibly lead to inaccurate results if the alignment of the laser beam was very off-center at the start, as in this case the circular cut-out has very oblique edges, producing inaccurate results when these are touched by the laser processing nozzle.

WO 2006/027085 discloses determining the position of a laser beam axis relative to a beam axis of a process gas jet. When the process gas jet touches an edge of an axial position detection element, the contact is detected through a deflection of the axial position of the detection element. In particular, contact of the laser beam with the edge of the axial position detection element is detected by a process light measurement and, by comparison of the contact points determined in each case, the position of the axis of the laser beam relative to the position of the axis of the process gas jet can be determined.

SUMMARY

Advantages will be appreciated from the description and the drawings. For example, the focal position of a laser beam relative to a body and the position of the laser beam relative to an opening can, in some cases, be reliably, precisely and reproducibly determining, in a simple and automated manner. In another example, the focal position and the position of the laser beam relative to the opening can be corrected, if necessary. Another advantage includes providing a laser processing nozzle that is suitable for use for touching edges.

In general, one aspect of the subject matter described in this specification can be embodied in a method for determining the reference focal position of a laser beam relative to a plate-like body, that includes: a) cutting off a portion of the body by means of the laser beam while simultaneously, and in some cases incrementally, altering the distance between the focal point of the laser beam and the plate-like body in the direction of the laser beam axis; b) laterally touching an edge formed on the body by cutting off the portion to determine coordinates of the edge; and c) determining a section of the edge protruding furthest using the determined coordinates and establishing the associated setting of the distance between the focal point and the plate-like body as the reference focal position of the laser beam.

In some implementations, a single continuous cutting line, which has a variable width depending on the focal position during laser cutting, is produced in the plate-like body serving as a test workpiece. The contour of the freely accessible cut edge formed on the remaining workpiece, after cutting off the portion, varies corresponding to the focal position, so that conclusions can be drawn about the focal position based on the coordinates of the cut edge. The focus setting of the narrowest section of the cutting line or the section on the edge that protrudes furthest indicates the focal position setting at which the focal point of the laser beam is located at the reference focal position on the workpiece surface.

In some implementations, the methods disclosed herein can be used to establish the base setting of a laser processing head, for example, after exchanging the laser processing head or after exchanging or cleaning of the focusing optics. In some cases, the methods disclosed herein also can be used in the context of process monitoring of the focal position. In that case, monitoring of the focal position occurs either cyclically at defined intervals in order to compensate for a gradual change in the focal position, or when processing problems occur (e.g., there is a deterioration in the quality of the cutting).

Cutting off the portion occurs preferably at high laser power. In some cases, cutting off the portion also can occur at laser powers below the nominal power normally used for processing workpieces, if the test workpiece can be cut through completely at the low laser output. In this connection, the kerf is preferably produced in the plate-like test workpiece under a supply of nitrogen cutting gas.

In some implementations, touching the edge is implemented using a mechanical touch tool including, for example, the nozzle body of the laser processing nozzle or by using a measuring probe mounted at a laser processing head. A suitably constructed nozzle body of the laser processing nozzle can serve as the touch tool. To increase precision during touching, it is also possible to use a measuring probe that is mounted at the laser processing head in addition to or as an alternative to the laser processing nozzle. The measuring probe can be in the form, for example, of a cylinder, and therefore have the advantage of a lower dimensional tolerance compared with a conventional laser processing nozzle. For the measurement, the measuring probe can be screwed to the laser processing head in place of the laser processing nozzle, for example, using an automatic nozzle changer, or can be positioned next to the laser processing nozzle and be securely connected to the laser processing head.

In some implementations, touching the edge is detected by way of a short circuit that occurs between the plate-like body and the mechanical touch tool. In this situation a voltage is applied between the touch tool and the plate-like body. If the touch tool includes the nozzle body, the short circuit can be detected, for example, by the distance sensor system of the laser processing head, which is electrically connected to the laser processing nozzle. In this implementation, preferably both the plate-like body and the touch tool include an electrically conductive material.

In some implementations, touching the edge is detected by a capacitive measurement of the distance between the edge and the mechanical touch tool. The distance between edge and touch tool can in this case by determined by continuously evaluating the distance signal of a distance sensor system that is measuring capacitance. Touching is established when the distance signal falls below a previously defined value. In this case, the distance sensor system measures the capacitance between the electrically conductive touch tool and an electrically conductive body. The capacitance is distance-dependent and decreases at the distance between touch tool and body increases. The capacitance measurement can be implemented by means of an oscillating circuit, the frequency of which is tuned as a function of capacitance. In general, the relationship between distance and frequency is based on an empirically determined relationship between a resonance frequency of the oscillating circuit and the capacitance.

In some implementations, touching the edge is implemented using the laser beam. In the process, the intensity of the radiation (e.g., plasma emission or process light) emitted from the region of an interaction zone between laser beam and body when the laser beam meets the edge is detected. Alternatively, or in addition, the transmitted power of the laser beam, which decreases when the laser beam meets the cut edge, can be measured. Alternatively, or in addition, the reflected power of the laser beam, which increases when the laser beam meets the cut edge, can be measured.

After the reference focal position has been determined, the focal point of the laser beam can be displaced in the direction of the laser beam axis in such a way that the focal point is located on the surface of the plate-like body. This setting is defined in the programming of the focal position as "setting 0 mm." This calibration procedure of the focal position programming is a prerequisite for being able to subsequently calculate and set, depending on the type of processing involved, an optimum focal position.

A change in focal position as far as defined limit values can be automatically compensated by monitoring the focal position, including, for example, monitoring a cyclic focal position. If the change in focal position is too great (in which case an automatic compensation is not sensible), further workpiece processing can be interrupted with a warning, in order to prevent production of rejects or destruction of the focusing lens owing to gradual onset of contamination and the associated increased absorption of the laser beam.

In some implementations, focusing optics arranged in the beam path of the laser beam can be displaced in the direction of the laser beam axis and/or the radius of curvature of at least one adaptive deflecting mirror disposed in the beam path of the laser beam can be changed in order to alter the distance between the focal point and the plate-like body. The focusing optics and the adaptive deflecting mirror can both be located in the laser processing head, where the laser processing nozzle also can be mounted. Alternatively, the adaptive deflecting mirror can be located upstream of the laser processing head in the beamline of the laser machine. To vary the position of the focal point, the focusing lens can be displaced and the curvature of the adaptive deflecting mirror disposed upstream of the focusing lens can be adjusted. The rear of the deflecting mirror can be flushed with water so that a variable water pressure produces a change in the radius of curvature and hence a change in the focal position. The distance between the laser processing head and the working plane can be kept constant in both cases.

In some implementations, a plate-like body having a thickness of between about 1.5 mm and 2 mm is used. If the plate-like body has a satisfactory thickness in the above range, the methods of measuring cut edges disclosed herein have the advantage that burrs formed on the bottom edge of the body do not disturb the measurement at the top edge of the body.

In some implementations, a plate-like body in the form of a band is used. In some cases, the plate-like body is sufficiently large such that multiple determinations of the focal position can be carried out before the body needs to be exchanged by an operator. An even higher number of measurements can be achieved if the body is in the form of a continuous, endless band, which after the relevant measurements is moved on, for example, using a system of rollers.

Another aspect of the subject matter described in this specification can be embodied in a method of determining the position of a laser beam relative to an opening in a nozzle body, that includes: a) touching two edges of a preferably plate-like body (e.g., a metal sheet) lying opposite in a first direction in space, by moving a nozzle body and the plate-like body relative to one another at least in the first direction in space to determine first contact points; b) touching the two edges or two additional edges of the plate-like body lying opposite in the first direction in space by moving the plate-like body and the laser beam relative to one another in at least the first direction in space to determine second contact points; and c) determining the position of the laser beam relative to the opening of the nozzle body in the first direction in space by comparing the first and second contact points.

This and other embodiments can optionally include one or more of the following features. For example, in some implementations, the mean value of the two first contact points in the first direction in space (e.g., the X-direction) can be determined by touching the first contact points with a nozzle body and compared with the mean value of the second contact points, which are determined by touching the second contact points with the laser beam. The difference in the mean values can describe the eccentricity of the focused laser beam in the first direction (e.g., the X-direction).

The opposing edges can be formed, for example, on a punched or cut aperture in the body or on opposing lateral edges of the body, and run preferably rectilinearly and parallel to one another in order to allow a defined touching. The nozzle body and the laser beam can touch respective opposing edges of the same aperture. Alternatively, or in addition, two separate apertures can be used, in which case the edges of the first aperture are touched using the nozzle body and the edges of the second aperture are touched by using the laser beam. A precise value of the geometric coordination of the two apertures is preferably known and taken into account when calculating the position of the laser beam relative to the opening.

In some cases, multiple separate apertures can be provided in the body for touching with the laser beam, since unlike touching with the nozzle body, a slight abrasion of material may occur when the laser beam is used for touching. Preferably from measurement to measurement, or after several measurements, a lateral offset of the laser beam is therefore provided when touching the edge, so that an "intact" measuring edge is always available. This procedure can sometimes be limited by the available length of the edge. If an aperture can no longer be used for touching by the laser beam, because the aperture no longer has a defined measuring edge, a switch can be made to another aperture, so that unduly frequent exchange of the body can be avoided.

In some implementations, the foregoing actions identified as a) to c) are carried out analogously for a second direction (e.g., Y-direction) in space to determine the position of the laser beam relative to the opening in the second direction in space. The difference in the mean values from touching with the nozzle body and touching with the laser beam in the second direction describes the eccentricity of the focused laser beam in the second direction. By determining the eccentricity of the laser beam in the two, preferably perpendicular, directions in space (e.g., X and Y), correction dimensions by which the laser beam and the nozzle body must be moved relative to one another in the two directions to produce concentricity with respect to one another are known.

In some implementations, the difference in the arithmetical mean values of the first and second contact points in the respective direction in space is determined. As stated above, a comparison of the mean values represents an especially simple option for determining the eccentricity of the laser beam. Other procedures are also possible for determining the position of the laser beam relative to the opening in the nozzle body from the contact points, for example, by first calculating the difference between first and second contact points detected at the same and corresponding edges respectively and then determining the mean value from the differences.

If the correction dimensions for the two directions (e.g., X and Y directions) are known, then the laser beam is positioned in the opening at a desired position, by moving the laser beam and the nozzle body relative to one another. If the laser beam is arranged off-center in the opening, then depending on the adjustment mechanism, the position of the focused laser beam or the position of the nozzle body can be shifted by the calculated difference in order to produce the concentricity of the laser beam in the opening.

In some implementations, contact with the edges during touching of the nozzle body can be detected by a short-circuit occurring between the body and the nozzle body. In this situation a voltage is applied between the nozzle body and the body and, on contact, a short-circuit is detected, for example, by a distance sensor system of the laser processing head, in which the system is electrically connected to the laser processing nozzle. In such implementations, both the body and the nozzle body can include an electrically conductive material.

In some implementations, contact with the edges during touching of the nozzle body can be detected by way of a capacitive measurement of the distance between the edges and the nozzle body. For example, a distance sensor system measures the capacitance between the electrically conductive nozzle body and the electrically conductive body. In such implementations, the capacitance may be distance-dependent and decrease as the distance from the edge increases, so that when the distance falls below a defined threshold value, touching of the nozzle body on the edge may be detected. The capacitance measurement can be achieved using an oscillating circuit.

In some implementations, a pin having edges for the nozzle body to touch is provided in the plate-like body, in which the touching is achieved using an inner lateral face of the opening of the nozzle body. In this connection, the pin must be designed so that it is able to "dip" into the nozzle outlet opening. The pin may also have a known geometric correlation with an aperture that is measured by means of the laser beam. Touching of the pin can be effected in this case in two directions (e.g., X and Y directions) separately, or can be carried out using, for example, three touching movements that are offset by 120°. There are several possibilities for shaping apertures for the touching by means of the laser beam: e.g. a square cut-out can be made next to or around the pin, or the body can be designed as a turning workpiece with the pin arranged, for example, in the center.

In some implementations, during touching of the laser beam in the action identified as b), the radiation emitted from the plate-like body on contact with the laser beam can be detected. For example, during this process, the intensity of the radiation (e.g., plasma emission or process light) coming from the region of an interaction zone between laser beam and body, which occurs when the laser beam meets the edge, is detected. Alternatively, the transmitted or reflected power of the laser beam can be measured.

In some implementations, in a preceding step, preferably starting from a predetermined midpoint, a portion of the plate-like body is cut out by means of the laser beam, while simultaneously (preferably incrementally), the distance between the focal point of the laser beam and the body in the direction of the laser beam axis is altered to form in the body an aperture having at least two edges lying opposite in the first direction in space. The aperture in the body is preferably a polygon having multiple parallel, opposite edges (e.g., an equilateral hexagon). During cutting of the individual edges, the Z-setting of the focal point is varied, but at least two opposite edges should be cut out with the same focus setting in order to be able to use these opposite edges to precisely determine the position of the laser beam in the opening of the nozzle body. Once the position of the laser beam in the two directions (e.g., X and Y directions) has been checked, and if necessary corrected, the reference focal position can additionally be determined at the edges of the aperture.

In some implementations, the actions identified above as b) and c) are carried out to determine the reference focal position of the focused laser beam relative to the plate-like body, preferably starting from a predetermined midpoint. From the midpoint of the aperture, each edge of the aperture can be touched by means of the nozzle body or by means of the laser beam in order to determine the furthest protruding edge and hence the reference focal position.

The subject matter described in the present disclosure can be implemented in a laser processing nozzle, in which there is formed, on the outside of the nozzle body, a cylindrical measuring face for touching of edges, the face extending parallel to and at a constant distance from the nozzle axis.

In some cases, the measuring face is in the form of an offset in the nozzle body. The offset can be formed by a groove that is made with the nozzle outlet opening in one chucking operation, so that a preferred concentricity with the nozzle outlet opening and the nozzle axis can be achieved in a simple manner. The offset can be arranged on the nozzle body in such a way that regions of the nozzle body protruding in the radial direction protect the offset against stray radiation and against material escaping upwards during processing and against routine collisions occurring during operation, so that the measuring face can be neither contaminated nor damaged.

The subject matter described in the present disclosure can be implemented in a laser processing machine. An numerical control (NC) program, which can run, for example, in a control or evaluation unit of a laser processing machine, is used to execute the measuring and touching movements, to activate the measurements, to store measurements and for calculation.

Additional advantages will be appreciated from the description and the drawings. The features set out above and those set out below can also be used individually or together in any combination. The embodiments illustrated and described are not intended to be understood to be a conclusive listing, but instead are of exemplary character for describing the invention.

The details of one or more embodiments are set forth in the accompanying drawings and the description below. Other features and advantages will be apparent from the description, drawings and from the claims.

DESCRIPTION OF DRAWINGS

FIG. 1b is a plan view of the process illustrated in FIG. 1a.

DETAILED DESCRIPTION

Figure 1A:
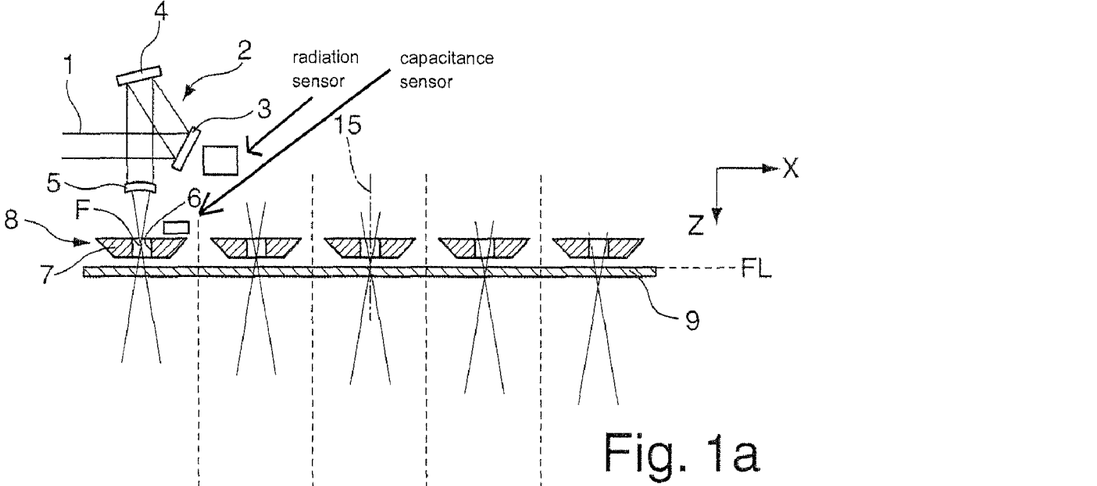
FIG. 1a is a schematic representation of an example process of cutting off a portion from a plate-like body through an incremental change in a distance between a focal point of a laser beam and the body.

FIG. 1a shows an example process of cutting off a portion from a plate-like body through an incremental change in a distance between a focal point of a laser beam and the body. As shown in the example of FIG. 1a, a laser beam 1 is diverted in a laser beam head 2 of a laser processing machine (not shown) by a first and a second deflecting mirror 3, 4 and by means of a focusing lens 5 onto a focal point F. The laser beam 1 can additionally be focused by the second deflecting mirror 4. The second deflecting mirror 4 can be adaptively constructed, i.e., when water is flushed on a rear side of the mirror 4, a change in water pressure can alter a radius of curvature of mirror 4 and hence the position of the focal point F along the laser beam axis (Z-direction).

Figure 1B:
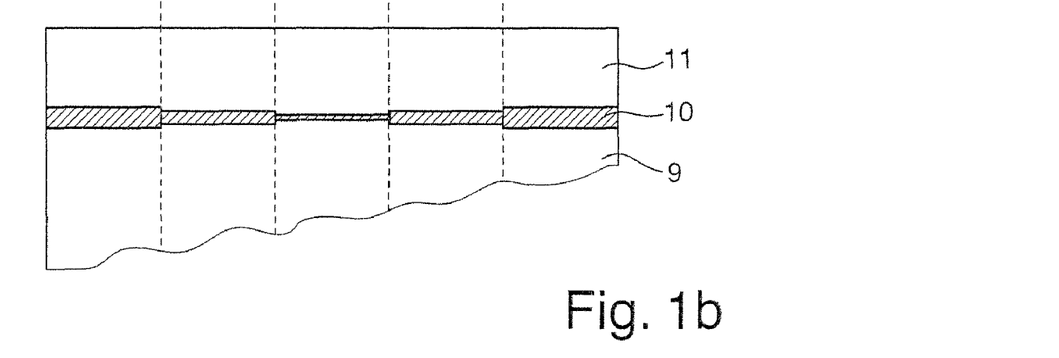

The focused laser beam 1 passes through an opening 6 of a nozzle body 7 of a laser processing nozzle 8 mounted at the laser processing head 2 and meets a plate-like body 9 in the form of a metal sheet arranged beneath the nozzle body 7. The laser processing head 2 is moved continuously in the X-direction, i.e., transverse to the laser beam axis Z, such that a cutting line 10 running in the X-direction (see FIG. 1b) is formed in the body 9. As the laser processing head 2 and the laser beam 1 move in the X-direction, the position of the focal point F in the laser beam direction Z is changed incrementally, as indicated by the dashed lines in FIG. 1a. In particular, the focusing lens 5 is displaced in the Z-direction and/or the adaptive deflecting mirror 4 is deformed. By changing the distance between the focal point F and the surface of the plate-like body 9, the diameter of the laser beam 1 striking the plate-like body 9 is likewise incrementally changed, so that the cutting line 10 has several sections, each of constant cutting width.

The laser beam 1 is operated at nominal laser power, e.g. 4 kW, at which typically a laser cutting process is carried out, so that the plate-like body 9, which has a thickness of about, for example, 1.5 to 2 mm, is completely cut through along the cutting line 10. The plate-like body 9 is supported at one side. That is to say, a portion 11 cut off the body 9 during laser beam cutting is not supported, so that this drops away downwards and an edge 12, shown in FIG. 2, formed on the body 9 by the laser cutting becomes freely accessible. Depending on the width of the sections of the cutting line 10, the edge 12 protrudes to different extents in a direction (e.g., along the Y-axis) that is perpendicular to the direction of movement of the laser processing head 2 (e.g., along the X-axis). It protrudes furthest in a section 12a, where the width of the cutting line 10 is narrowest, that is to say, the focal point F of the laser beam 1 in the focus setting selected in section 12a was located directly at the top face of the body 9, so that at this setting a reference focal position FL of the laser beam 1 of the laser processing machine is established and stored in the NC control unit. Once the reference focal position FL is fixed, the focal point F can be shifted in the Z-direction so that the focal point when "focal position 0 mm" is programmed is located on the top face of the body 9. Depending on the application, focal position offsets can then be programmed. By checking the focal positions, a change in focal position can in this way automatically be compensated up to defined limit values. In some implementations, the focal position can be checked periodically. If the focal position changes too radically, in which case automatic compensation may not be sensible, further processing of the workpiece can be interrupted with a warning in order to prevent the production of workpieces that will be rejected and/or to prevent damage to the focusing lens 5.

Figure 2:
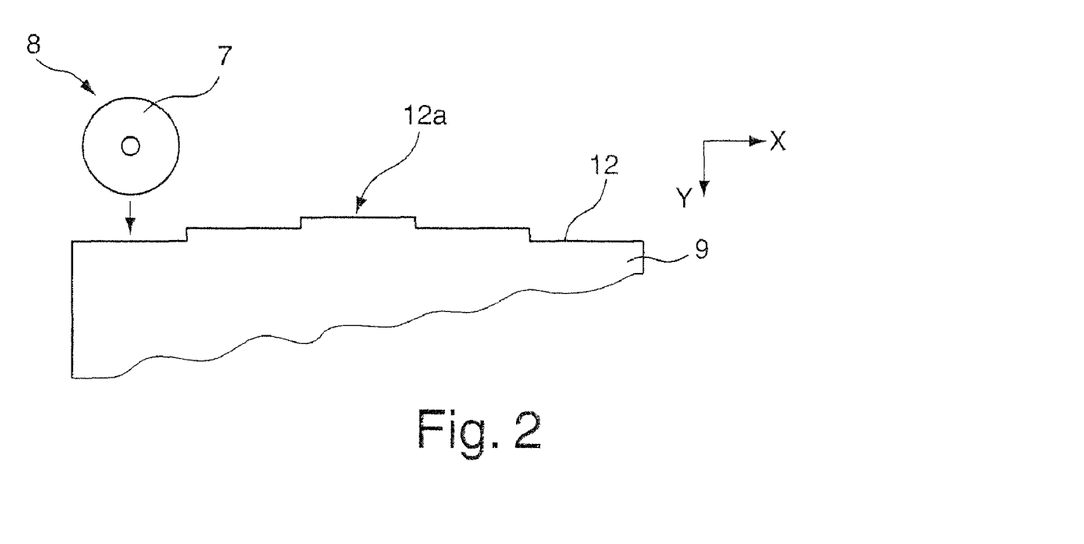
FIG. 2 shows an example of touching an edge formed on a plate-like body.

To identify the section 12a of minimum width of the cutting line 10, and hence the reference focal position FL, the edge 12 of the body 9 can be touched using the outside of the nozzle body 7 in the respective sections with a constant width of the cutting line 10, as shown in FIG. 2. In such implementations, the laser processing head 2 is moved in a direction toward the body 9 (e.g., the Y-axis direction) until the outside of the nozzle body 7 contacts the edge 12 of the body 9. For each touch, the machine axis setting of the laser processing machine is stored and the coordinates of each contact point on the edge 12, which are provided by a control unit of the laser processing head 2, are stored in an NC control unit. Each contact point is associated with the corresponding programmed position of the focal point F of the laser beam 1 during laser cutting. In the present example shown in FIG. 2, the contact point at which the Y-axis coordinate is a minimum corresponds to the reference focal position FL, in which the laser beam 1 is focused on the top face of the body 9.

In contrast to the situation shown in FIG. 2, touching/contacting the plate-like body 9 can also be carried out using a measuring probe as the touch tool. For example, the measuring probe can be exchanged with the laser processing nozzle 8 on the laser processing head 2 using a nozzle changer (not shown) or the measuring probe can be securely connected to the laser processing head. In both cases, the touch of the particular touch tool on the edge 12 can be detected by way of a short-circuit occurring between the plate-like body 9 and the mechanical touch tool when a voltage is applied between the electrically conductive touch tool and the electrically conductive body 9. Alternatively or additionally, the touch on the edge 12 can also be detected by a capacitive distance measurement between edge and touch tool, for which an oscillating circuit is customarily used.

Apart from determining the coordinates of the edge 12 mechanically, this can also be carried out optically, for example, by using the laser beam 1 to touch the edge 12. In this case, the intensity of the radiation (e.g., plasma emission or laser light) coming from the region of an interaction zone between laser beam and body 9 and occurring when the laser beam 1 meets the edge 12 is detected. Alternatively, the transmitted power of the laser beam 1, which decreases when the laser beam 1 meets the edge 12 of the body 9, can be measured. Alternatively, or in addition, the reflected power of the laser beam 1, which increases when the laser beam 1 meets the edge 12 of the body 9, can be measured.

To carry out the above described method, it is not necessary to provide a rectilinear cutting line. On the contrary, the sections of the cutting line can also form an angle with one another. Furthermore, instead of cutting off a portion from the edge region, such as shown in FIG. 2, the portion can be cut off from an inner region of the body 9, so that an aperture is formed in the body 9. This is especially advantageous when the cut-off portion is small enough to be received by a discharge device provided in the laser processing machine for the discharge of workpiece parts, so that this cut-off part can be carried in a simple manner away from the body 9 and the cut edge of the body 9 becomes freely accessible.

Moreover, the number of sections at which laser beam cutting is performed with a constant distance between focal point and body can be selected to be smaller or larger than as shown in FIG. 2, depending on the desired precision of the measurement result. To carry out a large number of measurements, it is advantageous that the length of body 9 extend far in the direction of movement of the laser beam 1 (e.g., X-direction).

The body 9 can be, in particular, in band form and, as it were, of continuous construction, and can be displaced using a suitable transport device between successive focal position determinations in the direction of movement of the laser beam. Alternatively or in addition, the laser processing head 2 can be displaced, for example, in the Y-direction, so that the laser beam 1 can produce a new cutting line (not shown) on the residual body 9 left after the portion 11 has been cut off.

In addition to determining the reference focal position FL, for the laser processing to achieve a directionally independent processing result, it is preferable to position the laser beam 1 centrally in the circular opening 6 of the laser processing nozzle 8. Accordingly, the position of the laser beam 1 in the opening 6 can be determined and, if it varies from the central position, corrected. Determining the position of the laser beam 1 in the opening 6 can also be carried out using the plate-like body 9. For example, FIGS. 3 and 4 show a portion of a plate-like body 9 in which a square aperture is provided, the square aperture being formed, for example, by laser beam cutting or punching.

Figure 3:
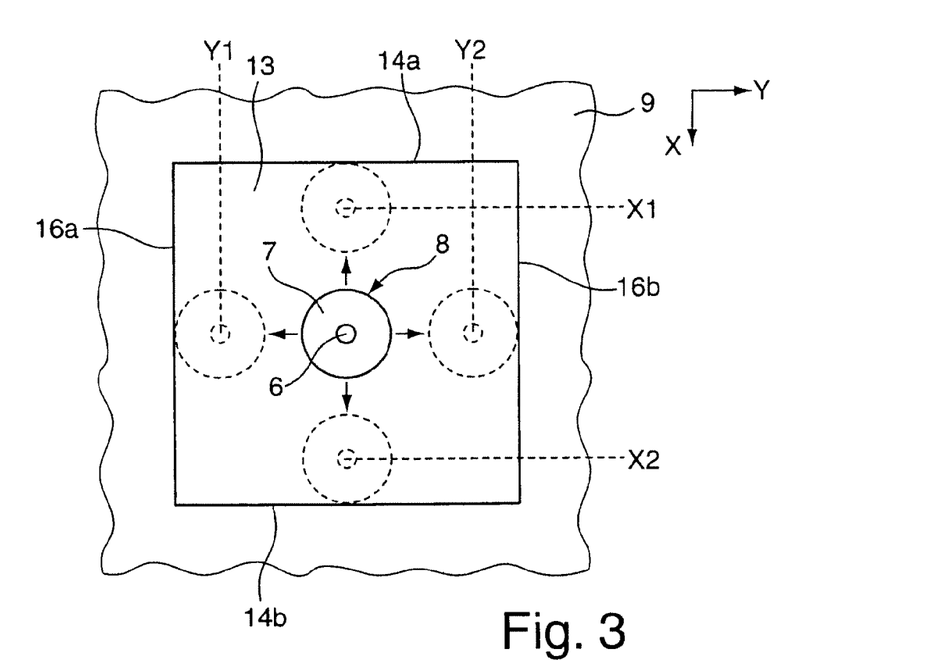
FIG. 3 shows an example of touching respective opposite edges of an aperture in a plate-like body.
Figure 4:
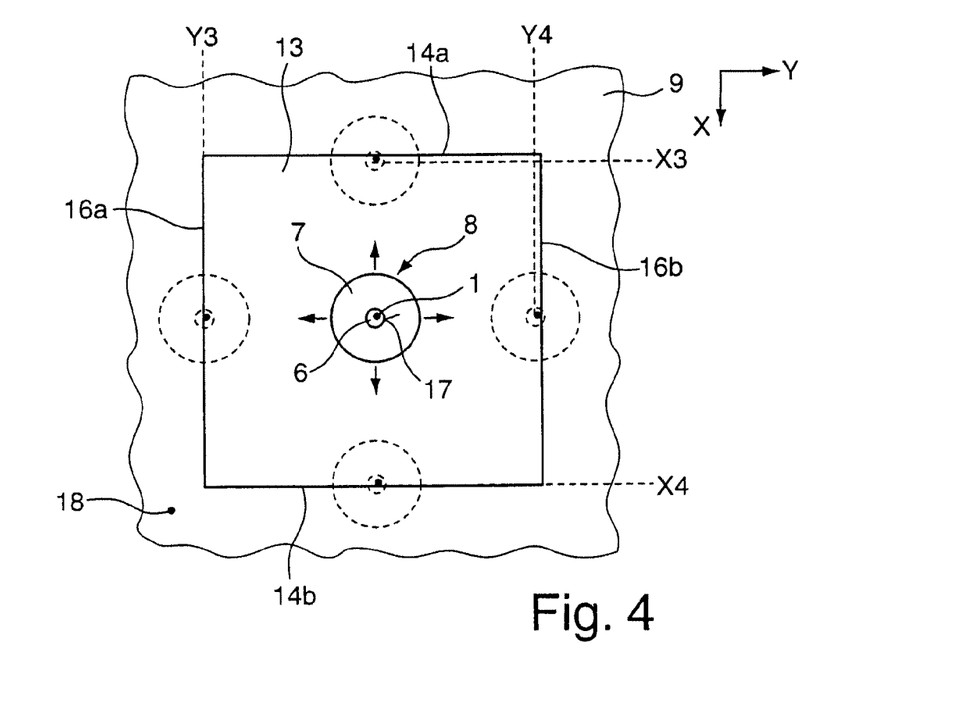
FIG. 4 shows an example of touching respective opposite edges of an aperture in the plate-like body of FIG. 3.

The middle of the square aperture 13 in a first direction (e.g., the X-axis direction) is first determined by touching two opposite edges 14a, 14b in the first direction with the outside of the nozzle body 7 of the laser processing nozzle 8 (with the laser beam switched off) by displacing the laser processing head 2, as indicated by the arrows in FIG. 3. Touching the edges 14a, 14b with the nozzle body 7 can be detected, for example, by an electrical short-circuit between the nozzle body 7 and the edges 14a, 14b or by a capacitive measurement, as explained further above.

Immediately after touching, the touching movement is stopped in each case and the particular position of the middle of the nozzle body 7, which is defined by a nozzle axis 15 (see, for example, FIG. 1a), is stored in the NC control unit in the form of first contact points X1 and X2 in the first direction (e.g., the X-axis direction). Touching is subsequently repeated for two corresponding edges 16a, 16b of the aperture 13 opposite each other in a second direction (e.g., the Y-axis direction). First contact points Y1 and Y2 for the second direction then are determined and stored in the NC control unit. By forming a mean value of the first contact points in the first direction (X-axis) and second direction (Y-axis), the coordinates of the middle of the aperture 13 in the body 9 during touching by means of the nozzle body 7 can be determined as MXD=(X1+X2)/2 and MYD=(Y1+Y2)/2 respectively.

Subsequently, the middle of the aperture 13 in the first direction (X-axis) and second direction (Y-axis) can be determined by touching with the focused laser beam 1. As shown in the example of FIG. 4, the focused laser beam is represented by a dot in the opening 6 of the nozzle body 7. The bottom edge of the nozzle body 7 in the Z-direction can be a defined distance, typically about 1 mm, above the plate-like body 9. The focal point F of the laser beam 1 of FIG. 1a is at the same time preferably set to a position a few millimeters above the surface of the body 9, although, in principle, other focal position settings (on or below the surface of the body) are possible. Touching the laser beam 1 on the corresponding edges 14a, 14b, 16a and 16b of the aperture 13 can be detected in this case, e.g., by measuring the process light or plasma emission generated when the edges 14a, 14b, 16a and 16b are reached. Both effects can be detected by different sensors. As soon as light is detected, the laser beam 1 is switched off and the axial movement is stopped, so that minimal material is abraded from the particular edge 14a, 14b, 16a and 16b being touched.

By touching the opposite edges 14a, 14b in the first direction (e.g., X-axis direction), second contact points X3 and X4 in the first direction can be determined. Second contact points Y3 and Y4 in the second direction (e.g., Y-direction) are determined analogously, by touching the two opposite edges 16a, 16b in the second direction. As described above, by forming the mean value of the second contact points in the first and second directions (e.g., the X-axis and Y-axis directions), the coordinates of the middle of the aperture 13 that result upon touching with the laser beam 1 are determined, i.e., MXL=(X3+X4)/2 and MYL=(Y3+Y4)/2 respectively.

In the aforementioned examples, the difference between the X-coordinate MXD of the middle of the aperture, which was determined upon touching using the nozzle body 7, and the X-coordinate MXL, which was determined upon touching using the laser beam 1, describes the eccentricity of the focused laser beam 1 in the X-direction in the opening 6 of the nozzle body 7. Similarly, the corresponding difference between the coordinates MYD and MYL in the Y-direction describes the eccentricity of the focused laser beam 1 in the Y-direction. The correction dimensions by which the laser beam 1 or the laser processing nozzle 8 have to be moved in the first direction and second direction to produce concentricity with respect to one another can therefore be determined. The laser beam 1 can subsequently be positioned at a desired position (not shown) in the center of the opening 6 by changing the position of the laser processing nozzle 8 relative to the laser beam 1 in the X- and Y-directions using suitable positioning devices with adjusting screws or using suitable motors. Alternatively or additionally, the focusing optics in the laser processing head 2 can also be used to achieve a displacement of the laser beam 1 relative to the nozzle body 7. Alternatively or additionally, tilting the adaptive deflecting mirror located upstream of the focusing optics can likewise be used to achieve a displacement of the laser beam 1 relative to the nozzle body 7.

Touching in two directions in space (e.g., X and Y) perpendicular to one another need not necessarily be carried out to determine the position of the laser beam 1 relative to the opening 6. Instead, edges that are arranged at different angles to one another and form, for example, an angle of 120° with one another, can also be used for that purpose.

Alternatively to touching the edges 14a, 14b, 16a and 16b using the outside of the nozzle body 7, as shown in the example of FIG. 3, the inner lateral face 17 of the opening 6 of the nozzle body 7 can also be used for touching. For this purpose, a cylindrical pin 18 can be provided in the body 9, although other shapes such as, for example, needle-like or conical shapes are also possible. If the pin 18 is of a conical construction, the pin 18 should have a very small diameter of a few tenths of a millimeter, in order to be able to be touched by the lateral face 17 of the opening 6 in the nozzle body 7, in which the opening 6 typically can have a diameter of about 0.8-3 mm. The pin 18 should also have a known geometrical coordination with the aperture 13, which is measured using the laser beam 1. Touching the pin 18 can, in this implementation, be effected separately in the first and second directions (e.g., X-axis and Y-axis directions) or performed using, for example, three touching movements offset through 120°. Touching the lateral face 17 of the opening 6 of the nozzle body 7 against the edges of the pin 18 can be detected as described above using, for example, an electrical short-circuit. There are several possibilities for shaping apertures for touching with the laser beam 1 relative to the pin 18. For example, as shown in FIG. 4, a square aperture 13 can be provided next to the pin 18. Alternatively, the aperture can be produced around the pin or the body can be in the form of a turning workpiece with the pin arranged, for example, in the middle.

The aperture 13 need not necessarily form a continuous opening in the body 9. The aperture 13 should be deep enough to allow touching by the nozzle body 7. As in the case of the pin 18, the edges for touching by the laser beam 1 can also form the outer edges of a protruding subzone of the body 9.

The method for determining the focal position can also advantageously be combined with the method for determining the position of the laser beam 1 relative to the opening 6 of the nozzle body 7. For that purpose, the aperture 13 in the body 9 on which touching is carried out can be produced by cutting out a portion (not shown) of the plate-like body 9 using the laser beam 1. Simultaneously, the distance between the focal point F of the laser beam 1 and the plate-like body 9 can be incrementally altered, so that by touching the edges 14a, 14b, 16a and 16b of the aperture, the reference focal position FL of the laser beam 1 relative to the body 9 also can be determined. In addition to the aperture 13 shown in FIG. 4 having a square basic shape, apertures having a different basic shape, e.g., polygons with preferably identical edge lengths, can also be formed on the body 9.

Figure 5A:
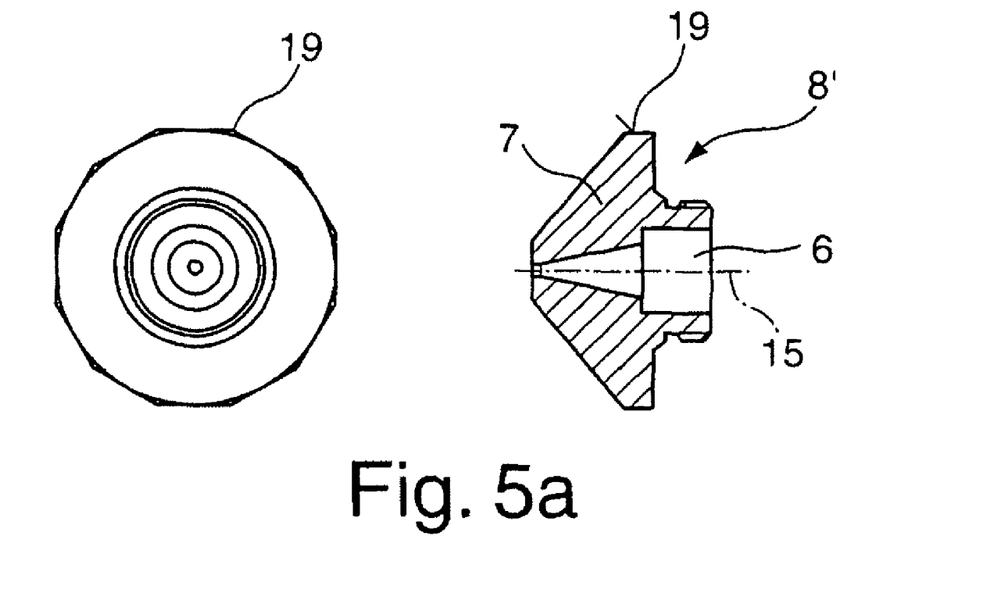
FIGS. 5a and 5b show examples of laser processing nozzles with a nozzle body.
Figure 5B:
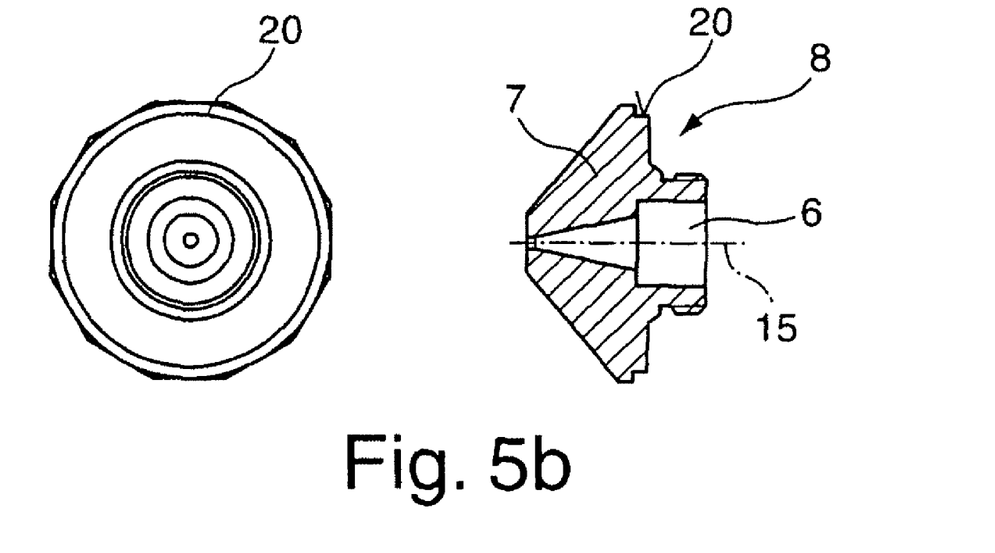

A conventional laser processing nozzle 8', as shown in FIG. 5a in a plan view and in a lateral section, is not well suited to touching against the edges 12 and 14a, 14b, 16a and 16b of the body 9, because in the region of its largest radial extent the nozzle has a milled or knurled outer surface 19 for clamping of the substantially conical nozzle body 7, which makes defined touching of an edge difficult. For touching, in the above-described methods a specially shaped laser processing nozzle 8 is therefore used, as shown in FIG. 5b. Unlike the conventional laser processing nozzle 8', shown in FIG. 5a, this laser processing nozzle 8 has on the outer surface 19 of the nozzle body 7 a cylindrical measuring face 20 extending parallel to and at a constant distance from the nozzle axis 15. This cylindrical measuring face forms an offset with respect to the outer surface 19 of maximum radial extent. The measuring face 20 disposed on the side of the conical nozzle body 7 remote from the workpiece is protected during the laser processing by the part of the nozzle body 7 lying further radially outwards, so that it does not become contaminated or damaged by stray radiation or material escaping during processing.

The offset with the measuring face 20 can in this case be made as a groove in one chucking operation with the opening 6 of the nozzle body 7, whereby the required concentricity with the opening 6 and the nozzle axis 15 is achieved. The constant distance of the measuring face 20 from the nozzle axis 15 can help ensure that edges can be approached by the laser processing nozzle 8 in a defined manner.

In the manner described above, an automated determination of the focal position of a laser processing machine relative to a workpiece and an automated determination of the position of a laser beam passing through an opening in a nozzle body of a laser processing nozzle relative to the opening are made possible. In the event of variations occurring, in both cases a correction can be performed. A respective NC program, which runs in a suitable control and evaluation unit of a laser processing machine, can be used to execute the touching movements, to activate the measurements, to store measurements and for calculation.

A number of embodiments have been described. Nevertheless, it will be understood that various modifications may be made without departing from the spirit and scope of the invention. Accordingly, other embodiments are within the scope of the following claims.

What is claimed is:

1. A method for determining a reference focal position of a focused laser beam passing through an opening in a nozzle body of a laser processing nozzle relative to a workpiece, the method comprising:
    producing a continuous cutting line in the workpiece by simultaneously cutting off a portion of the workpiece using the focused laser beam and altering a distance between a focal point of the focused laser beam and the workpiece along a direction of a central axis of the laser beam, wherein a boundary of the continuous cutting line is defined by a continuous workpiece edge formed by the cutting;
    determining coordinates of the edge, wherein determining coordinates of the edge comprises contacting the edge with a mechanical touch tool, and the mechanical touch tool comprises the nozzle body of the laser processing nozzle or a measuring probe mounted on a laser processing head, and wherein an extent to which the continuous edge protrudes from the workpiece varies based on a change in focal position of the focused laser beam during the cutting;
    performing an operation selected from the list consisting of i) detecting a short circuit between the workpiece and the mechanical touch tool when the mechanical touch tool contacts the edge, ii) measuring a capacitance between the mechanical touch tool and the workpiece and detecting contact with the edge based on the capacitance measured, and iii) combinations thereof;
    determining, based on the coordinates, a section of the edge that protrudes furthest from the workpiece; and
    establishing a reference focal position (FL) of the laser beam based on the coordinates corresponding to the section of the edge that protrudes the furthest from the workpiece.

2. A method according to claim 1, wherein altering the distance between the focal point of the focused laser beam and the workpiece comprises at least one of:
    displacing focusing optics in the direction of the axis of the laser beam, the focusing optics being arranged in a beam path of the focused laser beam; and
    changing a radius of curvature of at least one adaptive deflecting mirror disposed in the beam path of the laser beam.

3. A method according to claim 1, wherein the workpiece comprises a thickness between about 1.5 mm and 2 mm.

4. A method according to claim 1, wherein the workpiece comprises a shape of an elongated sheet.

5. A method according to claim 1, wherein the workpiece comprises a metal sheet.

6. A method of using a laser processing machine, wherein the laser processing machine comprises (1) a laser beam processing head configured to direct a laser beam toward a workpiece during operation of the laser processing machine, the laser beam processing head comprising at least one deflecting mirror and a focusing mirror, wherein the focusing mirror is configured to alter a distance between a focal point of the laser beam and the workpiece in a direction of an axis of the laser beam during operation of the laser processing machine, (2) a laser processing nozzle mounted on the laser beam processing head, the laser processing nozzle comprising a laser nozzle body, and (3) a control unit, the method comprising:
    moving the laser processing nozzle so that the nozzle body or a measuring probe mounted to the laser beam processing head laterally travels along and contacts a continuous edge of the workpiece during operation of the laser processing machine;
    determining coordinates of the edge contacted by the laser nozzle body or by the measuring probe, wherein determining coordinates of the edge comprises performing an operation selected from the list consisting of i) detecting a short circuit between the workpiece and the nozzle body or the measuring probe when contacting the edge, ii) measuring a capacitance between the workpiece and the nozzle body or the measuring probe, and detecting contact with the edge based on the capacitance measured, and iii) combinations thereof;
    based on the coordinates, determining a section of the edge that protrudes furthest from the workpiece; and
    establishing a reference focal position FL of the laser beam based on the coordinates corresponding to the section of the edge that protrudes the furthest from the workpiece.

* * * * *